United States Patent [19]
Slifkin et al.

[11] Patent Number: 5,955,942
[45] Date of Patent: Sep. 21, 1999

[54] METHODS AND MEANS FOR MONITORING EVENTS IN VEHICLES

[76] Inventors: Timothy P. Slifkin, 47 Lake Rd., Morristown, N.J. 07060; Lech W. Glinski, P.O. Box 508, Ironia, N.J. 07845

[21] Appl. No.: 08/563,527
[22] Filed: Nov. 28, 1995
[51] Int. Cl.$^6$ .................................................. B60Q 1/00
[52] U.S. Cl. ...................... 340/436; 340/438; 340/988; 364/424.04; 364/566
[58] Field of Search ................... 340/436, 438, 340/988; 364/424.03, 424.04, 566, 569

[56] References Cited

U.S. PATENT DOCUMENTS

| | | | |
|---|---|---|---|
| 4,745,564 | 5/1988 | Tennes et al. | 364/566 |
| 5,129,605 | 7/1992 | Burns et al. | 246/5 |
| 5,400,018 | 3/1995 | Scholl et al. | 364/424.03 |
| 5,426,595 | 6/1995 | Picard | 364/569 |
| 5,475,597 | 12/1995 | Buck | 340/438 |

*Primary Examiner*—Jeffery Hofsass
*Assistant Examiner*—Timothy Edwards, Jr.
*Attorney, Agent, or Firm*—Leo Stanger

[57] ABSTRACT

Events in a vehicle are monitored by producing electrical outputs representative of events in the vehicle, comparing characteristics of one event with characteristics of other events accumulated over a given period of time and determining departures of a given extent from the other characteristics as an indication of a significant event, and sending a warning in response to the indication, particularly with the position of the vehicle determined by a global position indicator on the vehicle. In an embodiment a microcomputer responds to the outputs of an accelerometer system mounted on a railroad car by comparing acceleration characteristics of one impact with accumulated acceleration characteristics of other impacts and determining departures of a given extent from other characteristics as a failure indication, signalling a warning in response to the indication.

30 Claims, 10 Drawing Sheets

RUNNING NUMBER OF IMPACTS IN SEPARATE
RANGES PER 24 HOURS

ACCELARATION IN Gs

ACCELERATION

RISE TIME

DELTA V

RISE TIME

FALL TIME

METHODS AND MEANS FOR MONITORING EVENTS IN VEHICLES

FIELD OF THE INVENTION

This invention relates to methods and means for monitoring impacts in a vehicle, and particularly for methods and means for determining or estimating if various constituents of a railroad car are functioning properly.

BACKGROUND OF THE INVENTION

Various events affect the operation of vehicles, such as trucks and railroad cars, and the safety of their cargoes. For example, vehicles and their respective cargoes, are subject to substantial shocks from sources such as rear and front impacts, out of round wheels, unbalanced wheels, and "hunting" of "trucks" which carry a railroad car's wheels. In railroad cars, efforts are made to limit damage from shocks by means of cushioning units mounted between cars. As long as these operate properly they help protect the railroad car and its cargo from the impacts that occur when cars are coupled together or from "intrain" forces that occur when the train is being pulled along the tracks.

In order to keep vehicles operating properly, it is desirable to obtain information, either in the vehicle, or at a remote locating or both, concerning events that affect the vehicle operation.

SUMMARY OF THE INVENTION

According to an embodiment of the invention, events in a vehicle are monitored by producing electrical outputs representative of events in the vehicle, comparing characteristics of one event with characteristics of other events accumulated over a given period of time and determining departures of a given extent from the other characteristics as an indication of a significant event, and sending a warning in response to the indication.

According to another embodiment, a position signal shows the position of the vehicle with a global position indicator, and the warning is sent with both the indication with the position signal.

The various features of novelty that characterize the invention are pointed out in the claims. Objects and advantages of the invention will become evident from the following detailed description when read in light of the accompanying drawings.

DETAILED DESCRIPTION OF PREFERRED EMBODIMENTS

Figure 1:
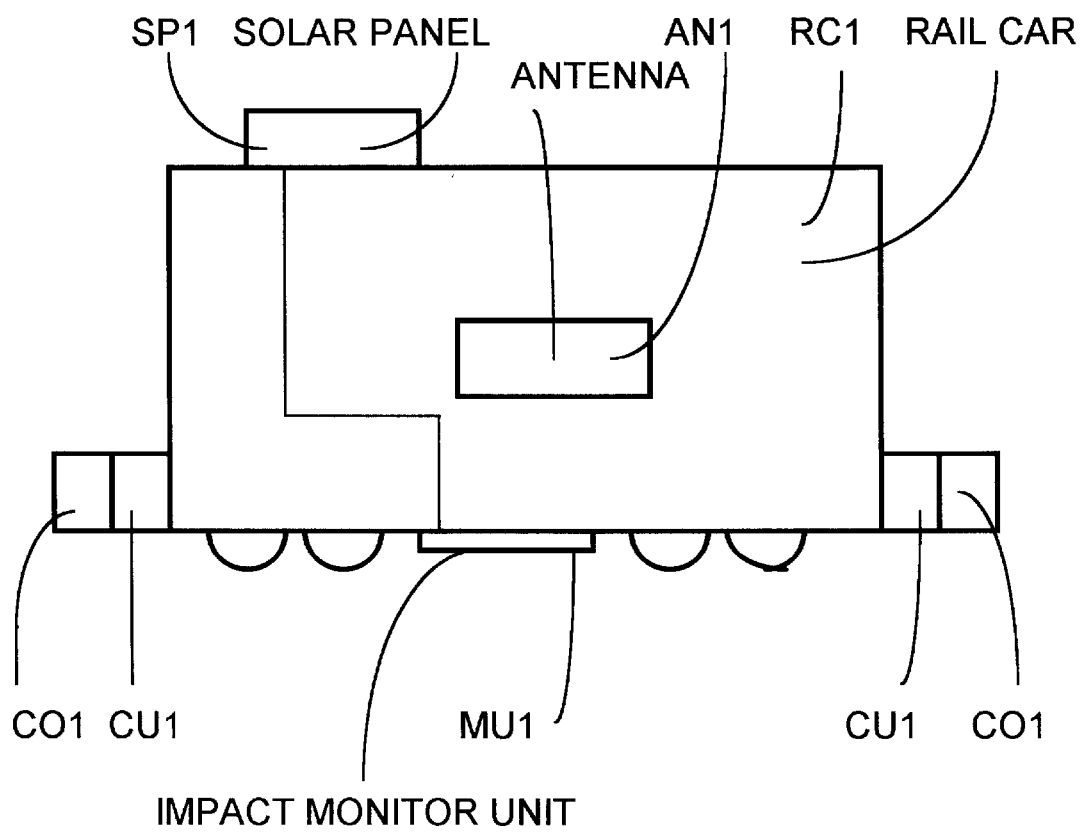
FIG. 1 is a schematic diagram of a rail car employing an embodiment of the invention.
Figure 2:
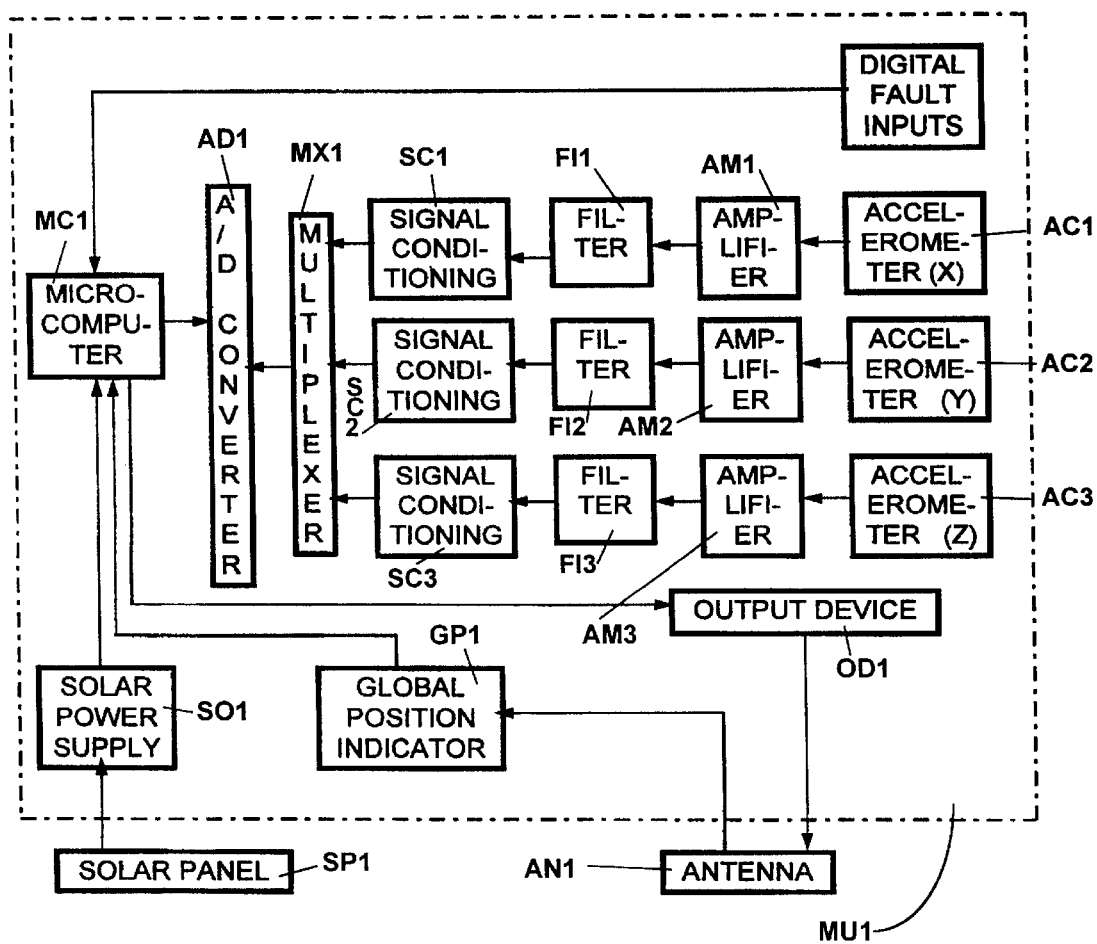
FIG. 2 is a schematic diagram of a system used in FIG. 1.

FIGS. 1 and 2 illustrate an embodiment of the invention where the events occur in a rail car. In FIG. 1, a rail car RC1 carries a solar panel SP1 for collecting solar energy to supplement an internal battery or other power source in an impact monitor unit MU1. An antenna AN1 connects to a global position indicator GP1 which is in the monitor MC1 and which responds to global position satellites (GPS) to establish the position of the car RC1. The output of the global position indicator GP1 also passes to the microcomputer MC1, and may receive data therefrom if needed. Couplers CO1 and CO2 join the rail car RC1 to other cars through respective cushioning units CU1 and CU2 which are fastened to the rail car itself.

The impact monitor unit MU1 captures all impacts above a certain level and in all directions from all sources, such as out of round wheels (vertical shocks), side to side sway, twisting, and longitudinal impacts. It then analyzes the impacts, and transmits the results to a central location, together with the location determined by the global position indicator GP1 to the antenna AN1. The latter transmits the information to a central station remote from the cars. The monitor MU1 unit also re-evaluates all impacts each time a new one is added. The system therefore includes effects due to the specific parameters of the car itself as well as its cargo.

As shown in FIG. 2, the impact monitor unit MU1 contains an accelerometer set AS1 composed of accelerometers AC1, AC2, and AC3, sensitive to shocks in respective orthogonal directions. For example, accelerometer AC1 is sensitive in the X horizontal longitudinal direction, accelerometer AC2 in the Y horizontal latitudinal (orthogonal to the horizontal longitudinal) direction, and accelerometer AC3 in the Z vertical direction orthogonal to the X and Y horizontal directions. Hence, shocks arriving in a direction angular to any of the X, Y, or Z directions cause the accelerometers to respond to the component of the angularly arriving shock along the respective orthogonal directions. Thus, the accelerometer, AC1, AC2, and AC3 each produce analog electrical outputs representing the components of any shock in their respective directions of sensitivity.

Amplifiers AM1, AM2, and AM3 receive the electrical analog outputs from the accelerometers AC1, AC2 and AC3 and apply them for filtering by respective filters FI1, FI2, and FI3 filter. Signal conditioners SC1, SC2 and SC3 then condition the signals by adding or removing signal elements. A multiplexer MX1 time-division multiplexes the analog signals, and an analog to digital (A/D) converter AD1 converts the multiplexed analog signals to digital form before applying them to a microcomputer MC1.

The microcomputer MC1 processes the information from the converter AD1 and transmits the processed data to an output device OD1 in the form of a transmitter. The latter transmits the data to the antenna AN1 which propagates the data to a central station directly or via satellite. The microcomputer MC1 may pass the data directly to the antenna AN1. At the same time the global position indicator GP1 passes its output to the antenna AN1. The latter then transmits the processed data and the global position indicator output to a central station, for example on the premises of a railroad office. The microcomputer MC1 may also operate the output device OD1 in the form of a tag or flag, an LED, serial communication, or a switch to notify service personnel that a failure is possible and maintenance is needed. The microcomputer MC1 may also relay relevant data via a serial port directly, or via the device OD1, to the antenna AN1 to another device (e.g. handheld terminal, satellite, cellular or radio communication port, etc.) The microcomputer may also process the data from the global position indicator GP1 and pass it to the antenna AN1.

If needed, the solar panel SP1 supplies energy to a solar power supply SO1 that energizes, or supplements other energy sources such as batteries for, all the elements in the monitor unit.

Figure 3:
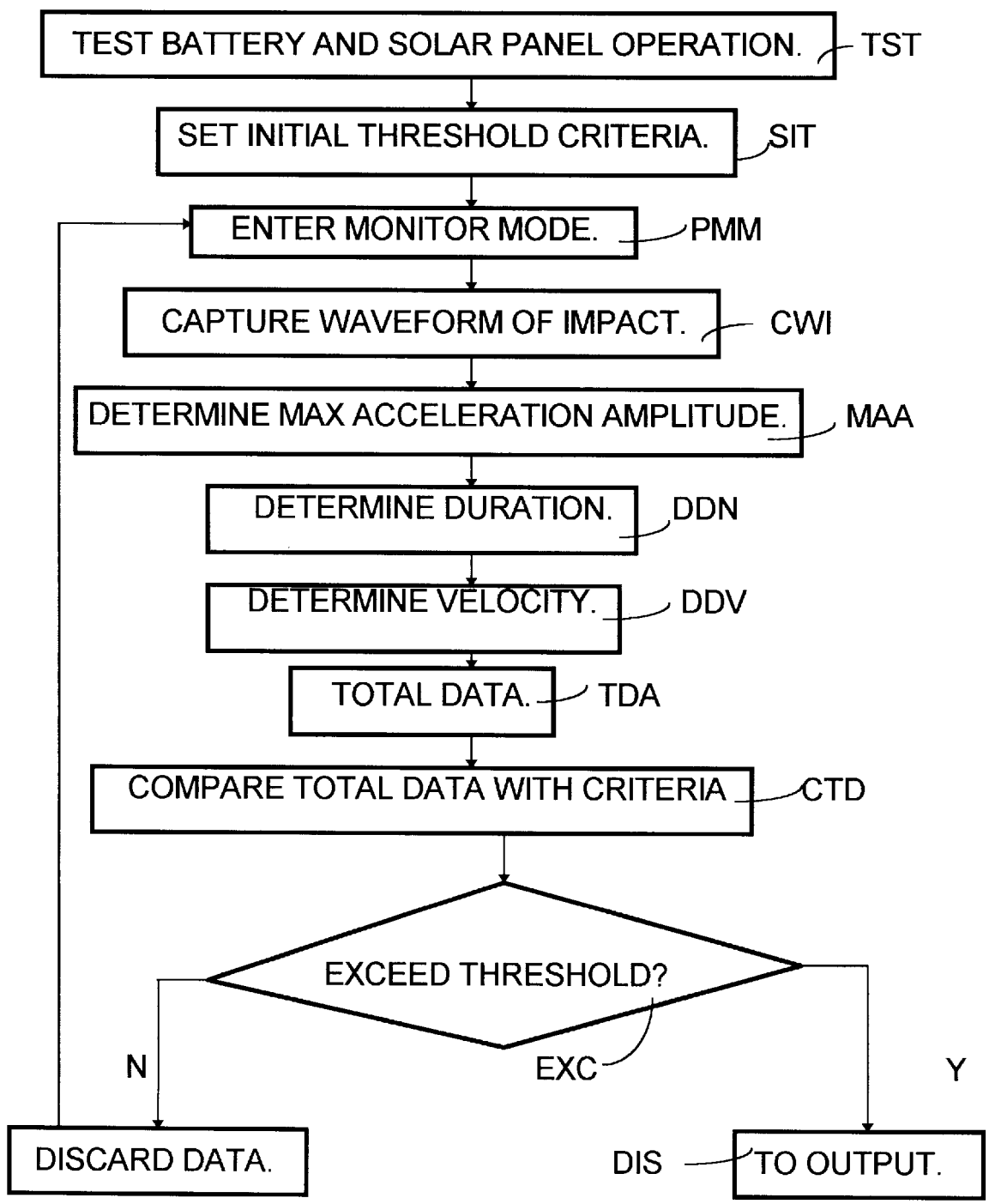
FIG. 3 is a flow chart of an embodiment of the operation of a microcomputer in FIGS. 1 and 2.

The microcomputer MC1 performs the steps shown in the flow chart of FIG. 3 to apply a warning signal to the output device OD1. According to one embodiment, the latter displays a signal representing a failure warning or send relevant information to another communication device via a serial port. According to another embodiment, the output device OD1 is a transmitter that transmits the data to the antenna AN1 which in turn propagates the data to a central station directly or via satellite.

In FIG. 3, the microcomputer MC1 first initializes the system and tests the battery, solar panels and other operating elements in step TST. In step SIT, the microcomputer MC1 sets an initial or first threshold which any signal from the accelerometers AC1, AC2, AC3 through the converter AD1 must exceed to be deemed of sufficient amplitude to exceed noise, for example 0.1 G. In step PMM it enters the monitor mode.

Figure 4:
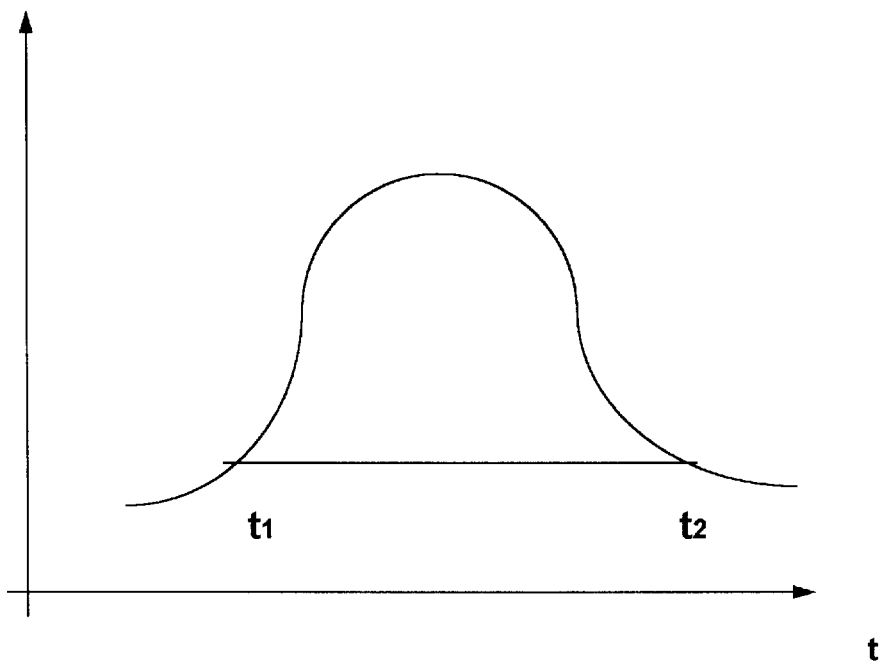
FIG. 4 is a graph illustrating the acceleration waveform of an impact and the determination of an event Δv as used in the system of FIGS. 1 and 2.

In the monitor mode, the microcomputer MC1 first determines if any impact exceeds a second threshold, one sufficiently significant to warrant transmission to the central station, and higher than the first threshold. For this purpose, while continuously responding to the multiplexed digital data from the A/D converter AD1, it captures the waveform of an impact in step CWI. An example of such a waveform appears in FIG. 4. In step MAA it determines the "shock peak" namely the maximum G acceleration amplitude or acceleration peak of any impact or shock. In step DDN it determines the "shock duration" i.e. the duration of the acceleration above a minimum threshold. In step DDV it determines the "impact velocity" or "Δ velocity", i.e. the integrated acceleration from a time t1 to a time t2, specifically $$\int_{t1}^{t2} a\, dt = \Delta v,$$

where a is the acceleration in G's, v velocity, and t1 and t2 times during the impact, as shown by an area AR1 under impact curve IC1 between times t1 and t2 in FIG. 4.

In step TDA, the microcomputer MC1 then establishes an "impact total" or "acceleration total" or "shock total" which is a total or weighted total, of these determinations and in step CTD then compares the "impact total" with the preset "second threshold" which is substantially higher than the first threshold. If the impact total exceeds the higher second threshold, the microcomputer MC1 deems the impact as a significant impact. According to one embodiment the microcomputer MC1 then transmits the data together with the data from the global position indicator GP1 to a central station. In step EXC if the impact total is less than the preset second threshold, the microcomputer MC1 does not send the data to the central station.

According to another embodiment, the computer MC1 utilizes both the data which it sends and which it does not send. It stores all the data that exceeds the first, lower, threshold. It further analyzes the data by comparing all new data that exceeds the first threshold with the history of prior data which is continuously updated with all data that exceeds the first threshold. This is done as shown in FIG. 5.

Figure 5:
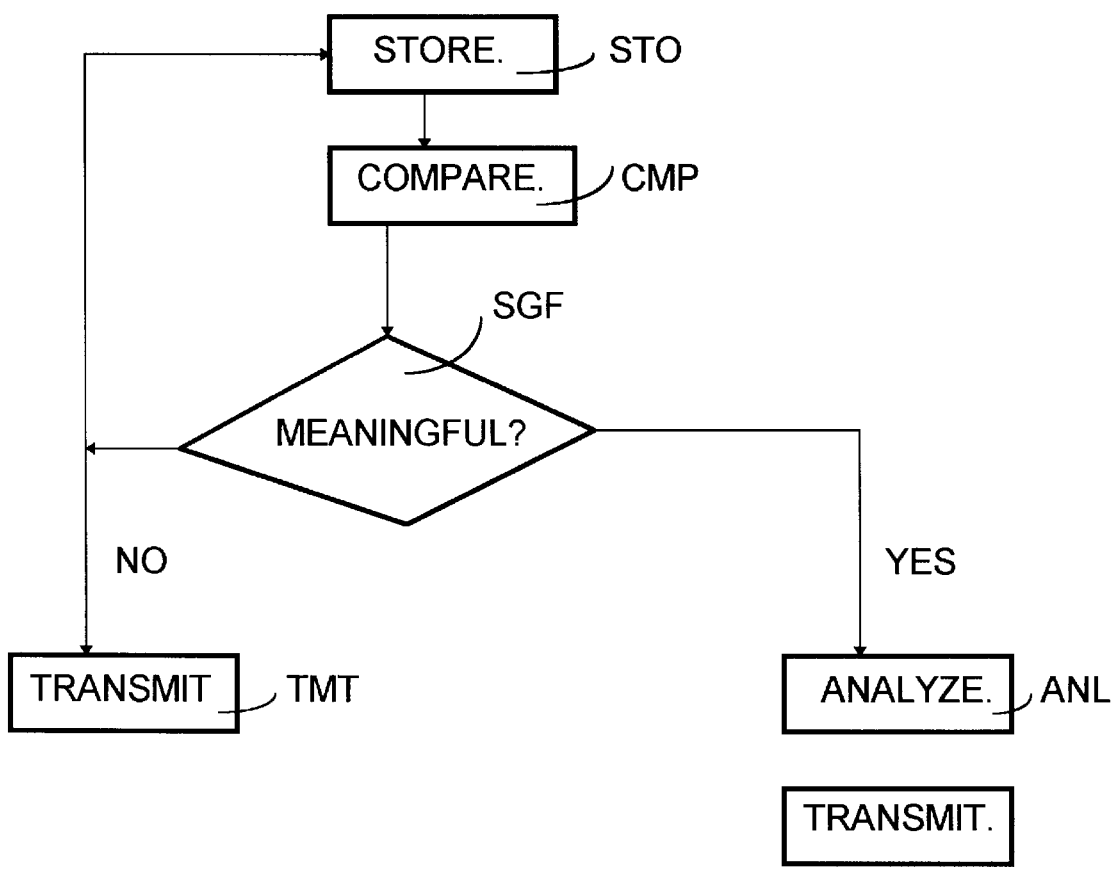
FIGS. 5 is a flow chart of another embodiment of the operation of a microcomputer in FIGS. 1 and 2.

In FIG. 5 the microcomputer MC1 stores a history of all new events, e.g. impacts etc., that exceed the first threshold, over a given period such as a month. This is done in step ST0. In step CMP it compares each new event with the historical data. In step SGF the microcomputer MC1 asks whether the departure is meaningful in that it exceeds given parameters. If yes, in step ANL it analyzes the data. It then transmits the analyzed data, together with the position from the global position indicator GP1 to the central station. If no, in step TMT it may also transmit the data to the central station for recording purposes.

Figure 6:
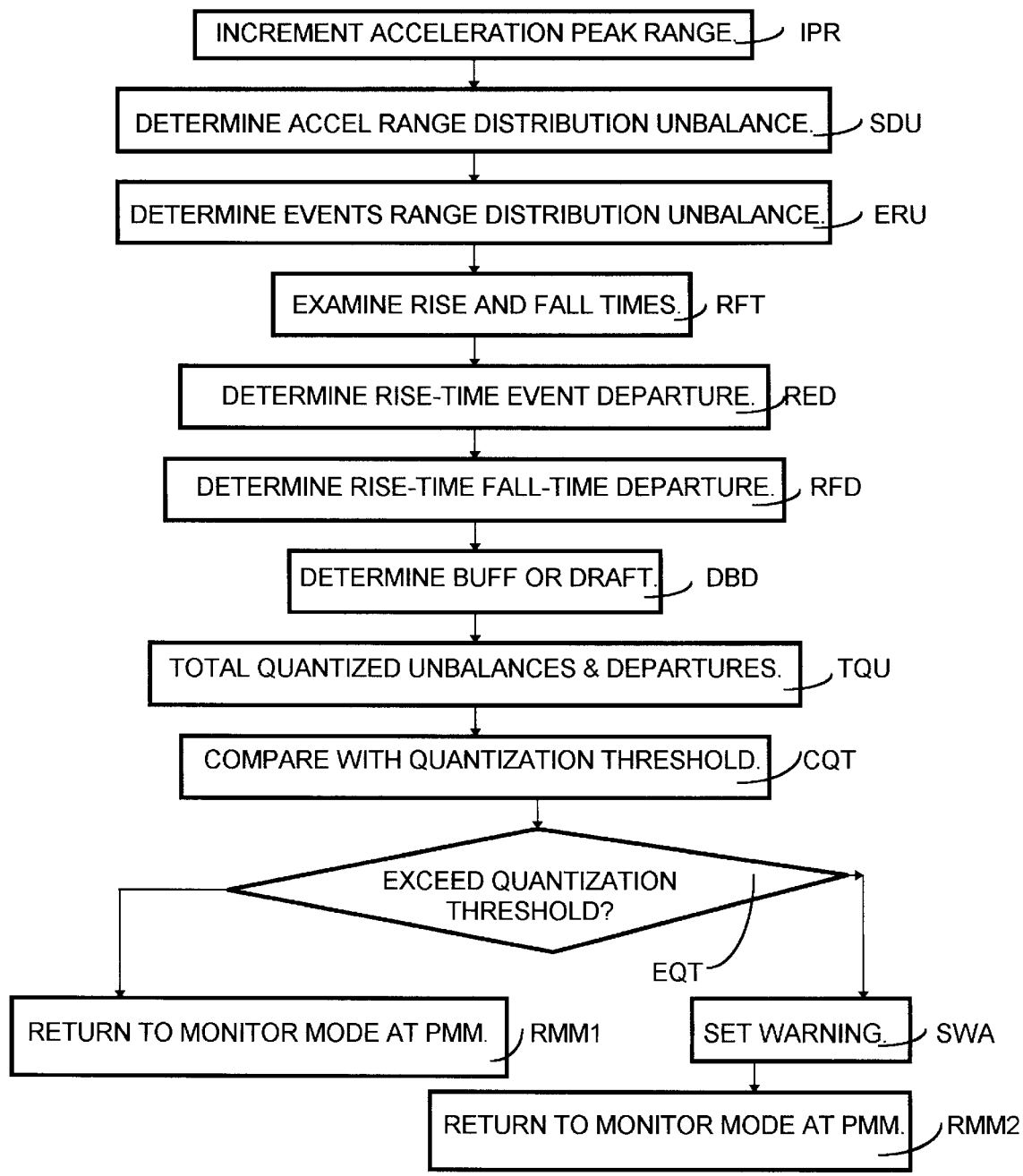
FIG. 6 shows details of FIG. 5.

An example of the process of FIG. 5 appears in FIG. 6. This example deals specifically with longitudinal impacts upon the cushions CU1 of FIG. 2 to determine if they are intact and operating properly.

The cushioning units CU1 are very large shock absorbers that protect the rail car RC1 and its cargo from the impacts that occur when two cars are coupled together, or from the inter-car forces that occur when a train is being pulled along the tracks. Various types of cushioning units exist. Newer ones are oil filled and pressurized with inert gas. Older ones are in the form of large springs with some time type of damping in the form of air or oil.

The impact monitor unit MU1 detects possible failure of the cushioning units CU1 and CU2 resulting from causes such as leakage of pressurized gas, damage to internal valves, damage to internal springs, leakage of seals, etc. Such failure would prevent the cushioning units from protecting the car and the cargo.

The impact monitor unit MU1 identifies a potentially defective cushioning unit CU1 or CU2 by using accumulated acceleration characteristics of one impact with accumulated acceleration characteristics of other impacts and determining departures of a given extent from other characteristics as a possible failure indication.

Only one of the accelerometers AC1, AC2, and AC3, namely the X-direction sensitive AC1, is used to detect operational problems in the cushioning units CU1 and CU2. The three accelerometers AC1, AC2, and AC3 together furnish information concerning hunting, wheel quality, track performance, turning, alignment, and vibration.

Figure 7:
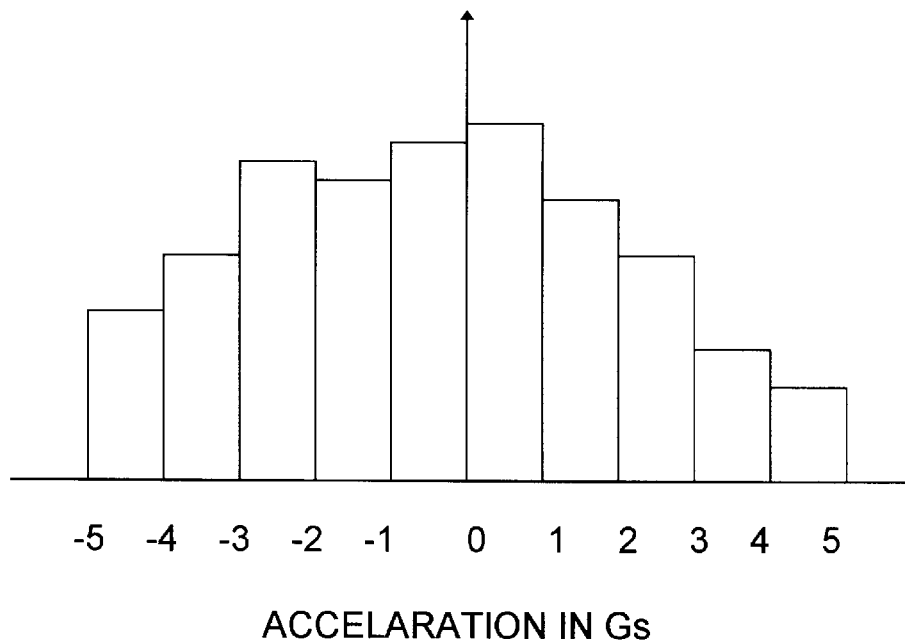
FIG. 7 is a graph illustrating the distribution of a running number of impacts within a multiplicity of ranges over a period of time as used in the system of FIGS. 1 and 2.

In step IPR of FIG. 6, the microcomputer MC1 divides accelerations into different acceleration ranges $-5G \ldots -G \ldots +G \ldots +5G$, where $1G=ft/sec^2$. An example of such ranges appears in FIG. 7. It keeps a count of significant "shock peaks" or acceleration peaks from step EXC in each acceleration range. In step IPR of FIG. 6, each time the microcomputer MC1 senses a "shock peak" or acceleration peak that fits into one of the ranges, it increments the count in that range by one. The microcomputer MC1 keeps running totals of shock peaks that match into each range for a time, such as 30 days, and thus develops a "shock peak distribution" pattern the example of which appears in FIG. 7.

In step SDU, the microcomputer MC1 looks for a "shock range distribution unbalance", (SRD unbalance) that is, a distribution unbalance in time accumulations of different ranges of shock maxima. The example of this distribution appears in FIG. 7. In this illustration, the distribution is unbalanced. Here, because the distribution of positive and negative shock peaks among the ranges is expected to be reasonably equal in a cushion, the microcomputer MC1 checks for an unbalance in the "shock peak distribution" pattern that exceeds a predetermined permissible unbalance. In step SDU, it also quantizes, weights, and records this "shock range distribution unbalance".

In step ERU, the microcomputer MC1 looks for an "event range distribution unbalance", (ERD unbalance) that is, a distribution unbalance in time accumulations of different ranges of "events", namely the aforementioned events $$\int_{t1}^{t2} a\, dt = \Delta v.$$

This distribution appears in

Figure 8:
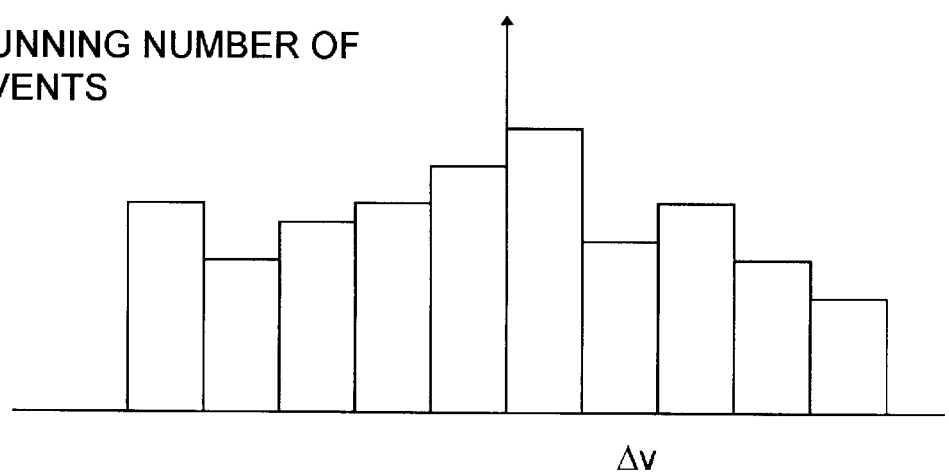
FIG. 8 is a graph illustrating the distribution of a running number of events Δv within a multiplicity of event ranges over a period of time as used in the system of FIGS. 1 and 2.

FIG. 8. Here, the microcomputer MC1 divides the events into different event ranges. It keeps a count of "events" in each range. Each time the microcomputer MC1 senses an "event" that fits into one of the ranges, it increments the count in that range by one. The microcomputer MC1 keeps running totals of "events" that match into each range for a time, such as 30 days, and thus develops a "event distribution" pattern an example of which appears in FIG. 8. Because the distribution of positive and negative, i.e. forward and backward, events are expected to be equal in a cushion, the microcomputer MC1 in step ERU checks for an unbalance in the "event distribution" pattern that exceeds a predetermined permissible unbalance. It quantizes, weights, and records this "event distribution unbalance".

Figure 9:
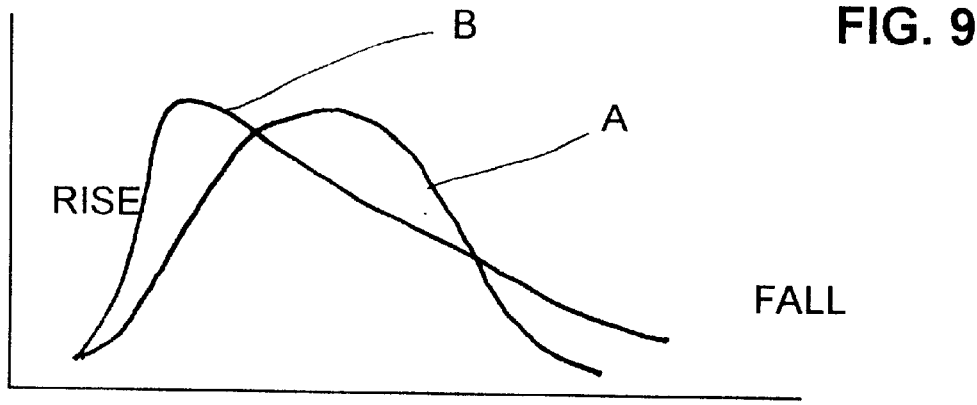
FIG. 9 is a graph illustrating the acceleration force of a single impact over a period of time as used in the system of FIGS. 1 and 2.

In step RFT, the microcomputer MC1 also captures the waveform of each significant impact and examines its rise and fall times. An example of a typical impact acceleration appears in curve A of FIG. 9. The microcomputer MC1 measures the rise time and the fall time between percentages such as 10% and 90%.

In step RED, the microcomputer MC1 uses the rise times to look for an "rise-time event departure", that is, a significant departure from time accumulations of different rise times that accompany different ranges of "events", namely the aforementioned events $$\int_{t1}^{t2} a\, dt = \Delta v.$$

Figure 10:
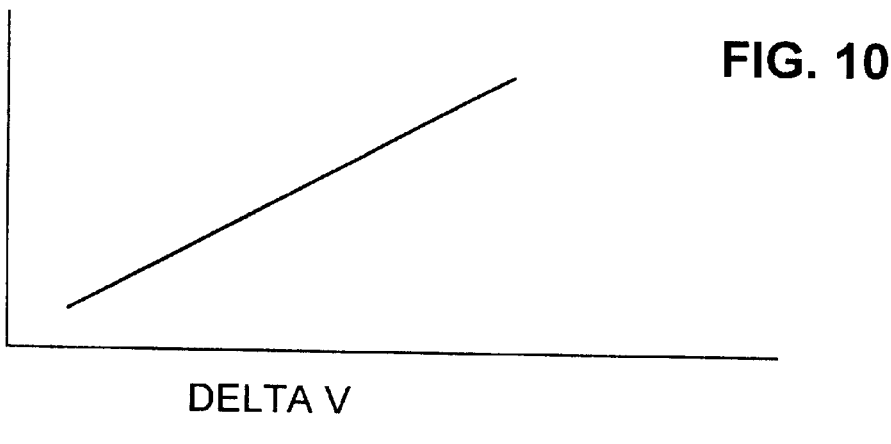
FIG. 10 is a graph illustrating acceleration rise times relative to the fall times over a number of impacts as used in the system of FIGS. 1 and 2.

This distribution appears in FIG. 10. Here, the microcomputer MC1 measures the acceleration rise time, such as from 0 to 90% of peak, sensed in each significant shock and determines its accompanying "event". It divides the events into different event ranges. It memorizes each rise time that accompanies each "event" in each range. The microcomputer MC1 keeps running totals of rise times for "events" for a time, such as 30 days, and thus develops a "rise-time event distribution" curve the example of which appears in FIG. 10. Because the rise times are expected fall within a band around the curve of FIG. 10 to represent a properly operating cushion, the microcomputer MC1, in step RED, checks for a significant "rise-time event departure" that exceeds a predetermined permissible departure. It quantizes, weights, and records each "rise-time event departure".

Figure 11:
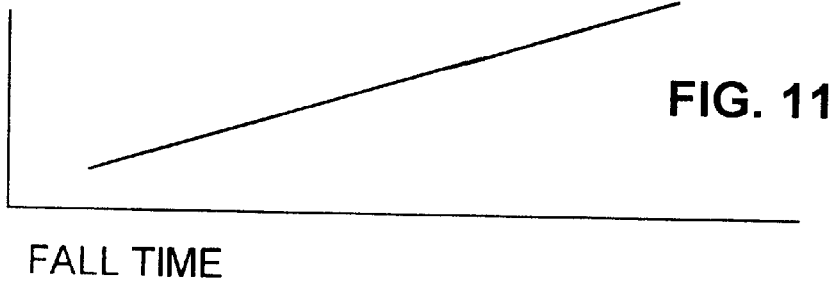
FIG. 11 is a graph illustrating acceleration rise times relative to events Δv over a number of impacts as used in the system of FIGS. 1 and 2.

In step RFD, the microcomputer MC1 looks for "rise-time fall-time departures", that is, a significant departure from time accumulations of different rise times that accompany different fall times as shown in FIG. 11. Here, the microcomputer MC1 measures the acceleration rise time, such as from 10% to 90% of peak, sensed in each significant shock and determines its accompanying fall-time, from 90% of peak to 10%. It memorizes each rise time that accompanies each fall time. The microcomputer MC1 keeps running totals of rise times followed by fall times for a period, such as 30 days, and thus develops a "rise-time fall-time" curve an example of which appears in FIG. 11. The rise times and fall times are expected to fall within a band around the curve of FIG. 11 to denote a properly operating cushion. In step RFD, the microcomputer MC1 checks for a significant "rise-time fall-time departure" that exceeds a predetermined permissible departure. It quantizes, weights, and records this departure.

In step DBD, the microcomputer MC1 estimates whether the impacts a buff or a draft. A departure or off-scale number is evidence of a buff or draft event. This arises from facts such that an oil leak in a cushion produces an air bubble in the cushion. A buff impact is generally higher than a draft impact and exhibits a high rise time as shown by curve B of FIG. 9. A draft generally draws out the cushion with less of a sudden rise.

In step TQU, the microcomputer MC1 then totals the quantized unbalances and departures, each of which represents an individual symptom that may be random or may denote a problem. The evidence of a "shock range distribution unbalance" in one direction or the other counters combined with the evidence of draft or buff in the "rise-time fall-time departure" points toward malfunction in the forward or rear cushion. For example a negative unbalance from the "shock range distribution unbalance" combined with a draft manifestation suggests a defect in the forward cushion.

As the total quantized unbalances and departures rise, they raise the confidence level that a defect exists in one of the cushions. In step CQT, the microcomputer MI1 compares the total of the quantized values with a quantization threshold. In step EQT it asks if the total of the quantized values exceeds the quantization threshold. If the answer is no, in step RMM1 the microcomputer MC1 returns the process to step PMM. If the answer is yes the microcomputer MC1 causes the output device OD1 to set a tag or flag, turn on an LED, or close a switch to notify service personnel that a failure is possible and maintenance is needed. It then returns to step PMM.

The acceleration peaks, the Δ values, the rise times, the fall times, and the acceleration durations each constitutes a measured acceleration characteristic.

Figure 12:
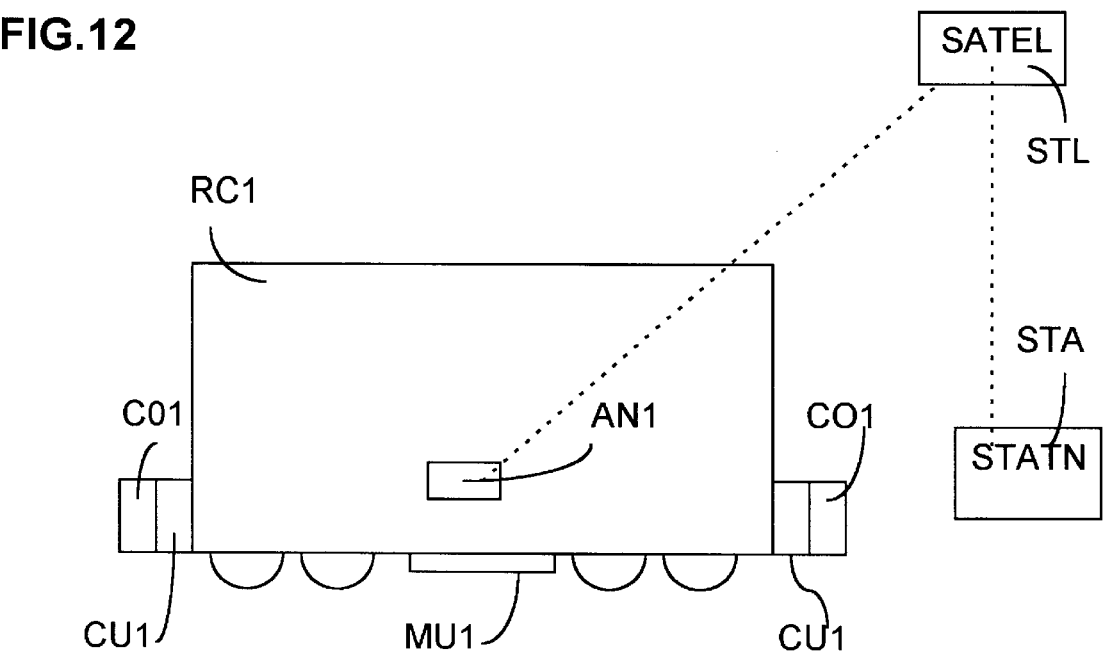
FIGS. 12, 13, 14, and 15 are schematic diagrams illustrating yet other embodiments of the invention.

According to another embodiment, the output device OD1 is a transmitter that transmits the data to the antenna AN1 which in turn propagates the data to a central station directly or via satellite. This embodiment appears specifically in FIG. 12 where the satellite is identified as STL. The satellite transmits the signal to a station STA that records this information together with the location of the car as determined by the global position indicator GP1.

Figure 13:
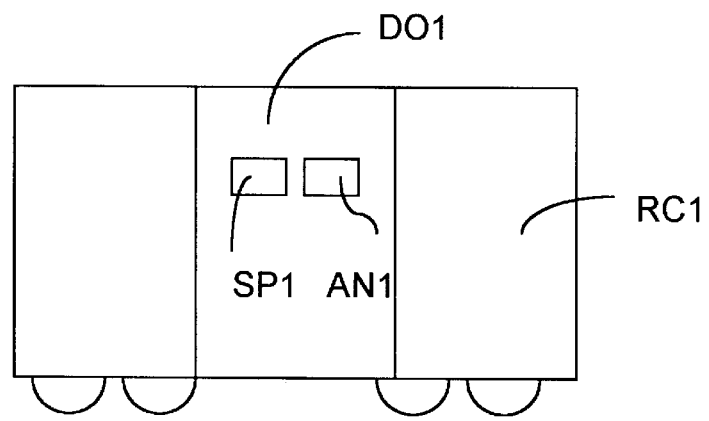
Figure 14:
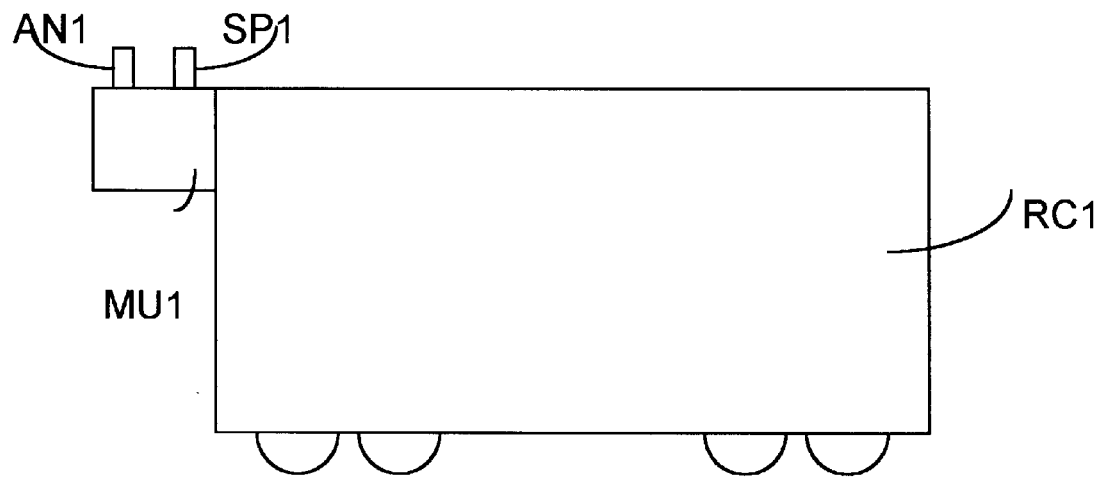
Figure 15:
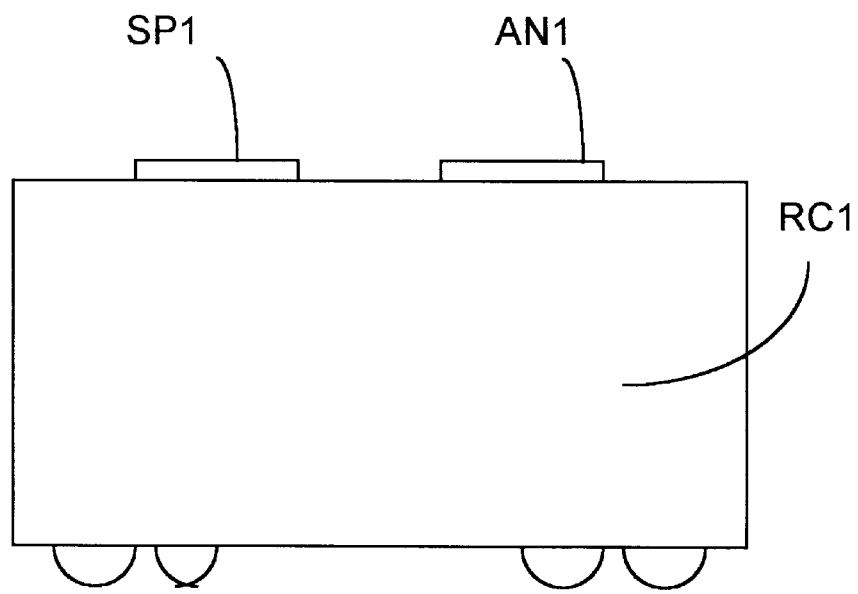

According to the embodiment of the invention in FIG. 1, the antenna AN1 is mounted on the door of the car RC1 and the solar panel SP1 mounted top of the car. According to the embodiment shown in FIG. 13, the antenna AN1 and the solar panel are mounted on the door DO1 of the car. According to the embodiment of FIG. 14, the unit MU1 is mounted on the rear of the car and the antenna AN1 and the solar panel SP1 are mounted on the unit MU1. According to the embodiment of FIG. 15, the antenna AN1 and the solar panel SP1 are mounted on top of the car CR1.

According to another embodiment of the invention, the outputs of others of the accelerometers AC1, AC2, and AC3 are used separately or combined as components in the microcomputer MC1. To determine wheel quality, the microcomputer MC1 utilizes the outputs of accelerometer AC3 along the Z axis, i.e. the vertical axis. That is impacts in the vertical direction indicate out of round conditions. The process in the flow chart of FIG. 6 is used for this and other purposes. For "truck hunting" i.e. the sway of the pivoted undercarriages that each carry four wheels of the car, the y axis and the rotational effects are calculated by the microcomputer MC1.

According to another embodiment of the invention, the solar panel SP1 and the antenna AN1 are integrated into one unit.

While embodiments of the invention have been described in detail, it will be evident to those skilled in the art that the invention may be embodied otherwise without departing from its spirit and scope.

What is claimed is:

1. A method of monitoring events in a vehicle, comprising:

the step of producing electrical outputs representative of events in the vehicle;

the step of comparing characteristics of one event with characteristics of other events accumulated over a given period of time and determining departures of a given extent from the other characteristics as an indication of a significant event; and the step of sending a warning in response to the indication;

the step of producing electrical outputs includes producing outputs representative of acceleration characteristics during an impact with an accelerometer system mounted on said vehicle; and the step of comparing and determining includes comparing acceleration characteristics of one impact with accumulated acceleration characteristics of other impacts and determining departures of a given extent from other characteristics as a failure indication.

2. A method as in claim 1, wherein the step of sending a warning includes producing a position signal showing the position of the vehicle, and sending the warning with both the indication with the position signal.

3. A monitoring method as in claim 1, wherein said comparing step includes counting the number of characteristics that fall into given ranges of characteristics in a given time and determining departures from given distribution of counts among the ranges.

4. A monitoring method as in claim 1, wherein one of said characteristics is the acceleration peak of the impacts.

5. A monitoring method as in claim 1, wherein one of said characteristics is $$\int_{t1}^{t2} a \, dt = \Delta v,$$

where a is acceleration, v is velocity, and $t_1$ and $t_2$ are times during an event.

6. A monitoring method as in claim 1, wherein one of said characteristics is $$\int_{t1}^{t2} a \, dt = \Delta v,$$

where a is acceleration, v is velocity, and $t_1$ and $t_2$ are times during an event.

7. A monitoring method as in claim 1, wherein said comprising step includes combining the relationship of acceleration rise times to fall times as indication of a buff or draft.

8. A monitoring method as in claim 1, wherein the step of producing electrical outputs includes producing outputs representative of acceleration characteristics during an impact in a longitudinal direction of the vehicle, and the step of comparing and determining includes comparing acceleration characteristics of one impact with accumulated acceleration characteristics of other impacts in the longitudinal direction.

9. A monitoring method as in claim 1, wherein the step of producing electrical outputs includes producing outputs representative of acceleration characteristics during an impact in a plurality of orthogonal directions of the vehicle, and the step of comparing and determining includes comparing acceleration characteristics of one impact with accumulated acceleration characteristics of other impacts in the plurality of orthogonal directions.

10. A method as in claim 1, wherein the step of sending a warning includes producing a position signal showing the position of the vehicle with a global position indicator, and sending the warning with both the indication with the position signal.

11. A monitoring method as in claim 10, wherein the events are impacts on the vehicle;

the step of producing electrical outputs includes producing outputs, representative of acceleration characteristics during an impact with an accelerometer system mounted on said vehicle; and the step of comparing and determining includes comparing acceleration characteristics of one impact with accumulated acceleration characteristics of other impacts and determining departures of a given extent from other characteristics as a failure indication.

12. A monitoring method as in claim 1, wherein one of said characteristics is the rise time of the impact.

13. A monitoring method as in claim 12, wherein said comparing step compares rise times with $$\int_{t1}^{t2} a \, dt = \Delta v,$$

where a is acceleration, v is velocity, and $t_1$ and $t_2$ are times during an event.

14. A monitoring method as in claim 12, wherein said comparing step includes comparing rise times with fall times.

15. A monitoring method as in claim 12, wherein said comparing step includes combining a plurality of departures from a plurality characteristics to obtain an indication of failure.

16. A system for monitoring events in a vehicle, comprising:

an electrical output generator for producing outputs representative of events in the vehicle;

means for comparing characteristics of one event with characteristics of other events accumulated over a given period of time and determining departures of a given extent from the other characteristics as an indication of a significant event; and a warning signaller responsive to the indication;

the electrical output generator includes an accelerometer arrangement mounted on the vehicle and the outputs are representative of acceleration characteristics during an impact; and the means for comparing and determining includes means for comparing acceleration characteristics of one impact with accumulated acceleration characteristics of other impacts and determining departures of a given extent from other characteristics as a failure indication.

17. A system as in claim 16, wherein said warning signaller includes a vehicle position signaller to send warnings with both the indication with the position signal.

18. A monitoring system as in claim 16, wherein said comparing means counts the number of characteristics that fall into given ranges of characteristics in a given time and determining departures from given distribution of counts among the ranges.

19. A monitoring system as in claim 16, wherein one of said characteristics is the acceleration peak of the impacts.

20. A monitoring method as in claim 16, wherein one of said characteristics is $$\int_{t1}^{t2} a\,dt = \Delta v,$$

where a is acceleration, v is velocity, and $t_1$ and $t_2$ are times during an event.

21. A monitoring method as in claim 16, wherein one of said characteristics is $$\int_{t1}^{t2} a\,dt = \Delta v,$$

where a is acceleration, v is velocity, and $t_1$ and $t_2$ are times during an event.

22. A monitoring system as in claim 16, wherein one of said characteristics is the rise time of the impact.

23. A monitoring system as in claim 16, wherein said comparing means combines the relationship of acceleration rise times to fall times as indication of a buff or draft.

24. A monitoring system as in claim 16, wherein the electrical output generator includes an accelerometer arrangement and the outputs ar representative of acceleration characteristics during an impact in a longitudinal direction of the vehicle, and the means for comparing and determining includes comparing acceleration characteristics of one impact with accumulated acceleration characteristics of other impacts in the longitudinal direction.

25. A monitoring system as in claim 16, wherein the electrical output generator includes an accelerometer arrangement and the outputs are representative of acceleration characteristics during an impact in a plurality of orthogonal directions of the vehicle, and the means for comparing and determining includes comparing acceleration characteristics of one impact with accumulated acceleration characteristics of other impacts in the plurality of orthogonal directions.

26. A system as in claim 16, wherein said warning signaller includes a global position indicator to send warnings with both the indication with the position signal.

27. A monitoring system as in claim 26, wherein the events are impacts on the vehicle;

the electrical output generator includes an accelerometer system mounted on said vehicle.

28. A monitoring system as in claim 22, wherein said comparing means compares rise times with $$\int_{t1}^{t2} a\,dt = \Delta v,$$

where a is acceleration, v is velocity. and $t_1$ and $t_2$ are times during an event.

29. A monitoring system as in claim 22, wherein said comparing means includes comparing rise times with fall times.

30. A monitoring system as in claim 22, wherein said comparing means includes combining a plurality of departures from a plurality characteristics to obtain an indication of failure.

* * * * *